United States Patent [19]

Kosakowski et al.

[11] Patent Number: 4,712,915
[45] Date of Patent: Dec. 15, 1987

[54] ARRANGEMENT FOR HOLDING AN INSTRUMENT IN ALIGNMENT WITH A MOVING REFLECTOR

[75] Inventors: Alex S. Kosakowski; Mats A. Lundqvist, both of Täby, Sweden

[73] Assignee: Geotronics AB, Danderyd, Sweden

[21] Appl. No.: 731,410

[22] Filed: May 7, 1985

[30] Foreign Application Priority Data

May 21, 1984 [SE] Sweden .............................. 8402723

[51] Int. Cl.$^4$ ...................... G01B 11/26; G01C 1/00; G01C 3/08
[52] U.S. Cl. ........................................ 356/152; 356/5
[58] Field of Search ............................. 356/152, 141, 5

[56] References Cited

U.S. PATENT DOCUMENTS

| | | | |
|---|---|---|---|
| 3,637,312 | 1/1972 | Cantor et al. | 356/152 |
| 3,809,477 | 5/1974 | Russell | 356/152 |
| 3,901,596 | 8/1975 | Vincent et al. | 356/5 |
| 4,240,069 | 12/1981 | Hullein et al. | 356/141 |
| 4,256,958 | 3/1981 | Cornwell | 356/152 |
| 4,560,270 | 12/1985 | Wiklund et al. | 356/5 |

Primary Examiner—Stephen C. Buczinski
Assistant Examiner—Melissa L. Koltak
Attorney, Agent, or Firm—Larson and Taylor

[57] ABSTRACT

The invention relates to an arrangement for holding an instrument aligned onto a movable reflector, which may have the form of a cube corner prism. The instrument has a transmitter which transmits a slightly divergent beam of electromagnetic radiation onto the reflector, and a receiver which receives the radiation reflected by the reflector. An optical periphery modulator is placed downstream of the transmitter in the proximity of a lens or in a collimated beam path. The modulator modulates differently various peripheral parts of the transmitted beam of radiation, and if the instrument is not correctly aligned with the prism, the modulator introduces a modulation of low frequency of the radiation received by the receiver in a manner such that the phase position of the modulation is dependent on the direction in which the transmitted beam of radiation deviates from optimal alignment with the prism, and such that the amplitude of the modulation signal is dependent on the extent of this deviation. An electric circuit analyses the phase of the modulation signal and controls an instrument aligning means on the basis of the analyzed phase, so that the reflector lies within a predetermined area of the optical axes of the transmitter and receiver, e.g. in the center of the transmitter lobe.

11 Claims, 8 Drawing Figures

FIG. 7

ARRANGEMENT FOR HOLDING AN INSTRUMENT IN ALIGNMENT WITH A MOVING REFLECTOR

INDUSTRIAL FIELD OF THE INVENTION

The present invention relates to an arrangement for holding an instrument aligned onto a reflector, e.g. a cube corner prism, which moves in relation to the instrument, said instrument comprising a transmitter which transmits towards the reflector an electromagnetic beam of radiation which is substantially collimated or slightly divergent, and a receiver which receives the beam of radiation reflected by the reflector.

Primarily the invention relates to an improvement in an instrument which is operative to transmit a fully or practically fully collimated electromagnetic beam of radiation modulated with a high frequency signal onto a reflector and to receive the radiation reflected by the reflector, but can also be used to align other types of instruments onto selected targets. The invention relates to an arrangement for finely adjusting the instrument onto the reflector, which preferably has the form of a cube corner prism and for holding the instrument in continuous alignment with the prism subsequent to finely aligning the instrument thereonto. The invention is primarily intended for use with a so-called electronic distance measuring instrument (EDM-instrument) the transmitter of which transmits radiation modulated with a high frequency (e.g. 15 MHz) and in which there is made a phase comparison between the modulated signal on the transmitted beam and the received modulated signal reflected by the reflector.

The distance to the prism is computed on the basis of the detected phase difference. The invention will be described hereinafter with particular reference to such an instrument.

In normal position determining operations using a distance measuring device or rangefinder which includes an EDMinstrument and a theodolite, the instrument is first roughly aligned onto a prism with the aid of a telescope and then finely aligned therewith with the aid of setting screws which adjust the instrument setting vertically and laterally unitl the signal received by the EDM-instrument is maximized.

Although this method affords sufficient accuracy, it takes a long time to carry out. This makes it practically impossible to use this method carrying out measurements on a moving target, on which a prism is located, since the operator is not able to track the prism with sufficient accuracy, since the prism also moves. This is particularly true when the unit bearing the prism moves at varying speeds and attitudes to the distance measuring device or rangefinder. This is the case, for example, when wishing to determine the position of a water-carried vessel which is under way.

PRIOR ART

For the purpose of tracking a moving target there is known to the art a method in which the transmitted beam of radiation is directed obliquely with an optical wedge which is permitted to rotate about an imaginary axis at a relatively low frequency, and the EDM-instrument is aligned vertically and longitudinally with the aid of a servo-mechanism, such that the low-frequency modulation superimposed on the received signal as a result of the rotation is as low as possible.

PROBLEMS TO BE SOLVED BY THE INVENTION

The accuracy to which measurements can be made with an EDM-instrument depends very largely on how accurately the instrument is aligned with the prism, and consequently rotation of the beam always places the measuring result in some doubt. It is desired to obtain as accurate a measuring result as possible even when the target is moving, and hence there has long been felt a need for a target tracking EDM-instrument with a transmitted beam which is held in steady alignment with the centre of the prism.

MEANS OF SOLUTION OF THE PROBLEMS

This need has been filed in an extremely effective manner with the arrangement according to the invention having the following combination: an optical modulator which is placed in the path of the beam of radiation transmitted by the transmitter; means effective to vary at a predetermined frequency the light intensity in a peripheral part of the beam in a cyclically varying manner about the optical axis of the transmitted radiation beam to induce a peripheral modulation of the peripheral part of the transmitted beam; and an electric circuit effective to analyze the signal of a periphery modulated part of the received signal and to control with the aid of servo means an instrument alignment means on the basis of the analyzed signal so that the reflector lies within a predetermined area of the optical axes of the transmitter and the receiver, e.g. in the centre of the transmitter lobe.

According to the invention an optical modulator is placed at the transmitter. This modulator effects peripheral modulation of the beam transmitted by the transmitter. This can be achieved with an aperture system of an optical system in which the aperture is inclined to the optical axis of the beam and in which the edge of said aperture which lies closest to the optical axis is located relatively close thereto, so as preferably to leave an opening of small area around the optical axis. The obliquely positioned aperture varies at a low frequency around the optical axis in a predetermined manner. The aperture system is preferably arranged to rotate at a constant frequency. The EDM-instrument transmits and receives radiation coaxially. The transmitted beam is slightly divergent.

The receiver includes an electric circuit which analyses the phase of the peripherally modulated part of the received signal and servo-controls an instrument aligning means on the basis of the analysed phase, such as to reduce the received peripherally modulated part of the signal to a minimum.

EFFECT OF THE INVENTION

By means of the arrangement according to the present invention there is obtained a servo-control with which the transmitted beam can be held in stable alignment with the centre of the prism, thereby providing approximately the same accuracy as that achieved with a stationary target when adjustments to the instrument are made by the operator.

BRIEF DESCRIPTION OF THE DRAWINGS

The invention will now be described in more detail with reference to the drawings, in which.

BACKGROUND INFORMATION OF LASER-BEAMS

Figure 1A:
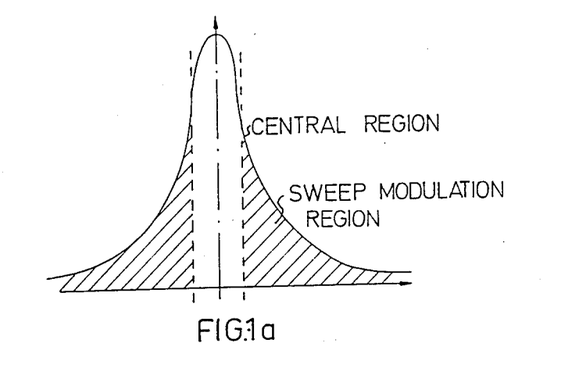
FIGS. 1a and 1b illustrate the intensity distribution through a cross-section and through a longitudinal section of a transmitted laser beam.
Figure 1B:
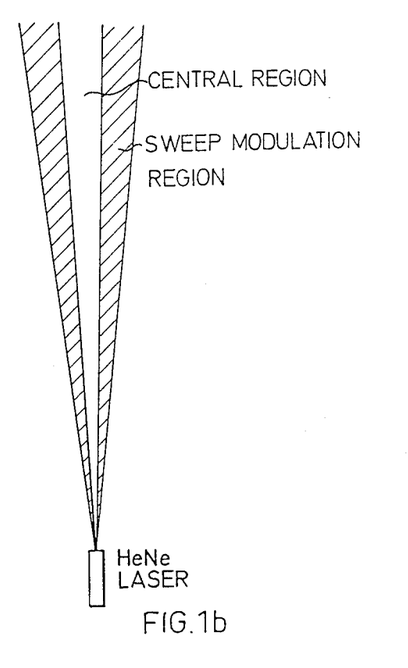

FIG. 1a illustrates the intensity distribution through a cross-section of a transmitted laser beam. FIG. 1b is a longitudinal sectional view of a transmitted laser beam, where the hatched portions are the same as those in FIG. 1a. It will be seen from FIG. 1a that the intensity distribution is a clock or bell curve with the major intensity collected around the centre and with asymptotically attenuating intensity some distance from the centre. Normally, an EDM-instrument is sighted exactly onto the reflector located on the target, which reflector is preferably a cube cube prism, so that only the centre part of the measuring beam is reflected back to the instrument. In accordance with the invention, the configuration of the intensity distribution is utilized in a manner such that the central part of the measuring-signal modulated beam transmitted from the transmitter is not affected by the instrument while the peripheral part of the beam is modulated with a relatively low frequency, for example by permitting the beam path to be partially screened by the aperture system of an optical system which while leaving free the control region of the beam around the optical axis varies cyclically around said axis in a predetermined manner, e.g. by rotating the aperture system therearound so that said region is sweep modulated. This peripheraly modulated region is hatched in FIGS. 1a and 1b.

EMBODIMENTS OF THE INVENTION

Figure 2:
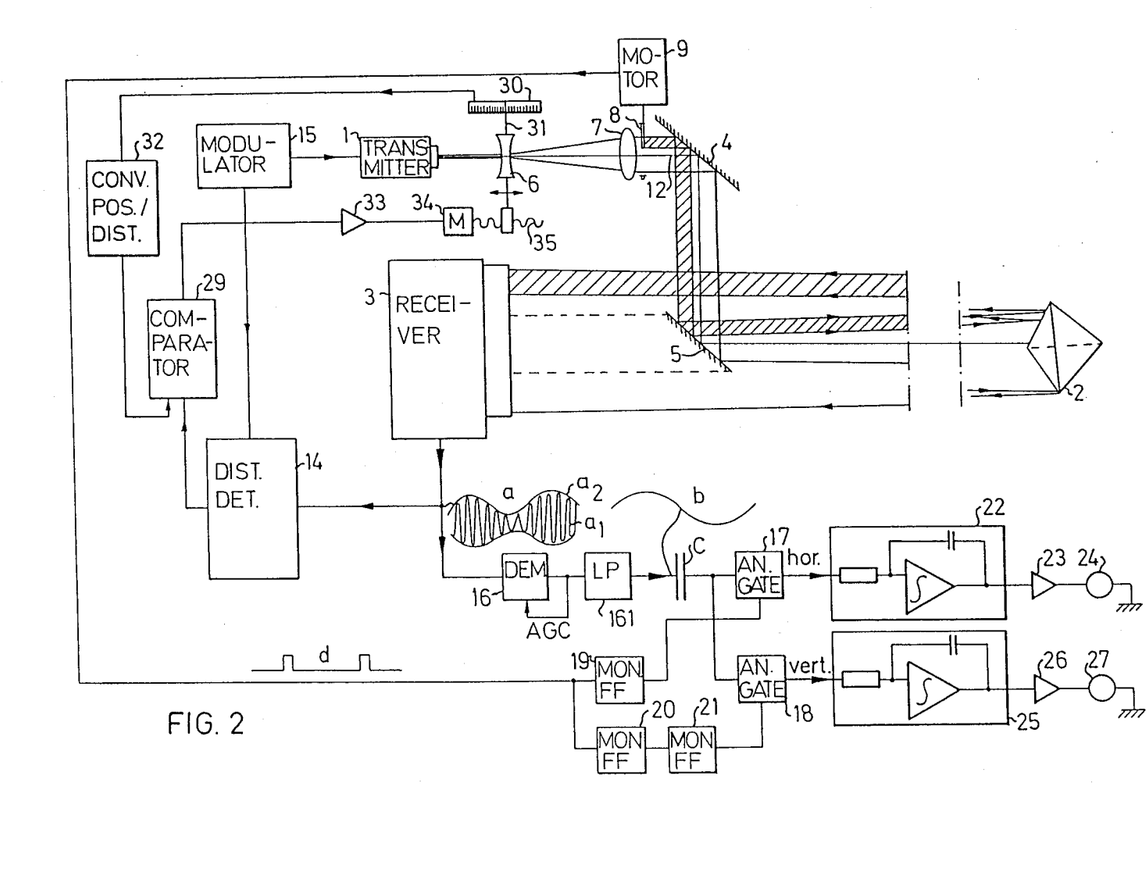
FIG. 2 illustrates a first embodiment of a target tracking rangefinder according to the invention.

FIG. 2 illustrates schematifally a first embodiment of the arrangement according to the invention. A measurement-frequency modulated light beam transmitted by a transmitter 1, which may include a visible light laser, is transmitted onto a reflector 2 located on a moving target, this reflector preferably being a cube corner prism. The beam reflected from the reflector 2 is received by a receiver 3 provided with a beam detector. The transmitted light beam is transmitted and received co-axially and consequently two obliquely positioned planar mirrors 4 and 5 are placed in the path of the transmitted beam, in a conventional manner. An optical device is arranged to broaden the beam from the transmitter and renders the beam slightly divergent. In the illustrated embodiment of FIG. 2 this optical device comprises a negative lens 6 and a positive lens 7. The degree of beam divergence can be made controllable, by making the negative lens movable along the optical axis. The significance of this will be made apparent in the following.

A rotatable so-called aperture system is located adjacent the optical device 6,7, in the proximity of the positive lens 7. The aperture system 8 is asymmetric and, when seen in a plane extending transversely to the optical axis, may have the appearance of the aperture system shown in FIG. 3, this unit being shown in front view in FIG. 3 and in larger scale. The aperture system exhibits a circular aperture with a screening part 10 over a part thereof, and is rotated with the aid of a motor 9 at a speed of 50 revolutions per second for example, which provides a low-frequency sweep-modulation of the light beam. As indicated by the broken-line circle, there is left around the optical axis 12 an area 11 which is not affected by the aperture system 8, which thus only affects the beam within its region 13. The laser 1 has low divergence, which means that the active emitting surface on the beam of radiation transmitted from the transmitter upstream of the aperture system substantially fulfills the requisite of a planar wave front. The aperture means 8 has a configuration such as to present an open part 11, which is not affected by rotation of the aperture system and which is so small that the central part of the beam will, to some extent, be influenced by the bending of the light taking place against that part of the aperture edge located nearest the optical axis. The central and most intensive part of the beam is practically unaffected by the aperture system however. In order to obtain a good functioning standard, this central part of the beam should include that part of the radiation which has a higher intensity than a predetermined proportion of maximum intensity. The central part is represented by the area in FIG. 1a which has not been hatched. The aforesaid proportion lies between 60% and 80%. The best result is obtained when this proportion is about 70%. The signal a forwarded from the receiver 3 includes a high-frequency range data component $a_1$ and a low-frequency deviation data component $a_2$, and is supplied firstly to circuits 14 effective in establishing in a conventional manner with the aid of a signal from the modulator 15 of the transmitter the distance measured by the EDM-instrument, and secondly to an instrument aligning unit which includes an amplitude demodulator 16 which rectifies and low-pass filters the incoming signal so as to retain a constant magnitude of the amplitude of the carrier wave signal with the aid thereof, this being effected by conventional AGC, i.e. automatic gain control. The rectified carrier wave signal is filtered through a further low-pass filter 161, so that the low-frequency signal b appears on the output of the demodulator 16, 161.

The incoming signal a can also be mixed down to a lower frequency prior to being demoulated. This downmixing of the signal a can be effected in conventional circuits in the EDM-instrument and is then the signal exhibited on the output of the receiver 3.

Any rectifying current components of the signal b which may be present are removed by a capacitor C connected in series with the demodulator 16. The capacitor C is connected to one input of a first analogue gate 17 and also to one input of a second analogue gate 18. Aperture-position pulses from the motor 9, with one pulse for each aperture revolution in a previously accurately determined angular position, are fed to a first monostable flip-flop 19 which over one half period of the duration of the low-frequency signal supplies a signal to a second input on the gate 17, which holds the gate open to allow the signal from the capacitor C to pass therethrough during this period of time. If the low-frequency signal has a frequency of 50 Hz, the monostable flip-flop is set to hold the gate 17 open for 10 ms. The aperture-position pulses are also supplied to a second monostable flip-flop 20, the output signal of which activates a further monostable flip-flop 21 after a time lapse corresponding to one quarter period subsequent to activation of the flip-flop 20. When activated, the flip-flop 21 holds the gate 18 open for one half period.

The aperture-position pulses delivered by the motor 9 are, for example, generated in the phase position in which the screening part 10 of the aperture unit 8 faces downwardly. In this way the gate 17 is held open during said half period, when the radiation in the upper part of the transmitted beam lobe is not affected by the aperture system. If the integrated signal from the gate 17 should deviate positively from O-potential, the received radiation intensity is greater when radiation is not influenced in the upper part of the lobe than when the radiation is not influenced in the lower part of the lobe. Consequently, in order to obtain equal received radiation intensity between the two half periods, the instrument should be sighted downwardly more. Correspondingly, if the signal from the gate 17 deviates negatively, then the instrument must be sighted upwardly more.

In order to achieve this alignment, the signal obtained from the gate 17 is supplied to a unit 22, which processes the signal to provide rapid and positive servo-controlled movement of the instrument. The unit 22 of the illustrated embodiment includes an amplified integrator, which although to be preferred does not exclude the possibility of utilizing other circuits in the unit 22.

The output signal from the unit 22 is fed to a servomotor 24 via a power stage 23, this motor 24 driving a horizontal shaft on which the EDM-instrument is journalled, suitably over a gear-box not shown.

The flip-flop 21 is activated by the signal from the flip-flop 20 one quarter period after the occurrence of a pulse d from the motor 9 and holds the gate 18 open for one half period, during which the aperture device 8 has no influence on the radiation in neither one nor the other direction horizontally. Thus, an integration of the signal a over this half period provides information relating to the direction in which the instrument shall be adjusted vertically in order to align the transmitted beam onto the prism 2.

In order to provide alignment adjustments in the horizontal direction, the signal obtained from the gate 18 is fed through a circuit 25 of similar design to the circuit 22. The output signal from the circuit 22 indicates whether the instrument setting shall be moved to the left or to the right. The signal from the circuit 25 is fed via a power stage 26 to a servomotor 27 which drives the instrument, optionally via a gear box (not shown), about a vertical shaft to which a holder for the EDM-instrument is attached.

The motor 9 runs at a constant speed, which is regulated in a conventional manner. Any changes in the rotational frequency which might nevertheless occur are all followed by a slave servomechanism, to generate the same phase reference for the remainder of the system.

The servomotors 24 and 27 should be so rapid as to exclude the introduction of delay errors into the aligning system. As a result of using integrators in the circuits 22 and 25, all deviations for the prism 2 from the central part of the light path will be added to a previously obtained result with a value referred to the O-value, wherewith alignment is effected without time-lag. This constantly provides the best rangefinding conditions, since the transmitted beam can be held firmly aligned on the prism.

As mentioned in the aforegoing, the lens 6 may be arranged for movement in an axial direction. This has two advantages to offer. Firstly, it enables the instrument to be aligned quickly onto the target at the beginning of a measuring sequence, at which stage the beam is relatively divergent, so as to readily place the prism within the beam cone, so that servo-control can commence. The beam cone convergence can then be reduced until the whole of the central part of the beam lies within the prism. As a result of diffraction at the aperture system and of divergence, a small part of the peripheral part of the beam will always fall within the reflector 2, this small part of the beam being used for servo-control purposes.

Secondly, the divergence of the transmitted beam cone is adapted to the distance of the target, such that the beam cone is more divergent for closely lying targets and more parallel for targets at greater distances, in order that the coverage of the reflector by the beam cone is as uniform as possible for each distance.

Axial adjustments to the position of the lens 6 can be made manually, although the FIG. 2 embodiments include means whereby such adjustments to the lens position are made automatically in response to changes in distance. Regulation of this setting must therewith take place much more slowly than the positional adjustments effected with the aid of the servo-motors 24 and 27. Distance data can be obtained from the distance or range detector and supplied to one input of a comparator 29. The position of the lens 6 is indicated on a position detecting unit 30, including for example, a scale with electronic sensing of the position of a needle 31 accompanying the movement of the lens 6. The signal from the unit 30 is fed to a converter 32 which converts the positional signal into a signal which indicates a suitable distance to the reflector 2 for this position. The output signal from the unit 32 is fed to a second input of the comparator 29. The output signal from the comparator 29 is fed, via a power stage 33, to a servo-motor 34 which controls the setting of the lens 6, e.g. with the aid of a setting screw 35, until the input signals to the comparator 29 lie within an acceptable range. The embodiment of the invention illustrated in FIG. 2 is that most preferred.

Figures 3, 4:
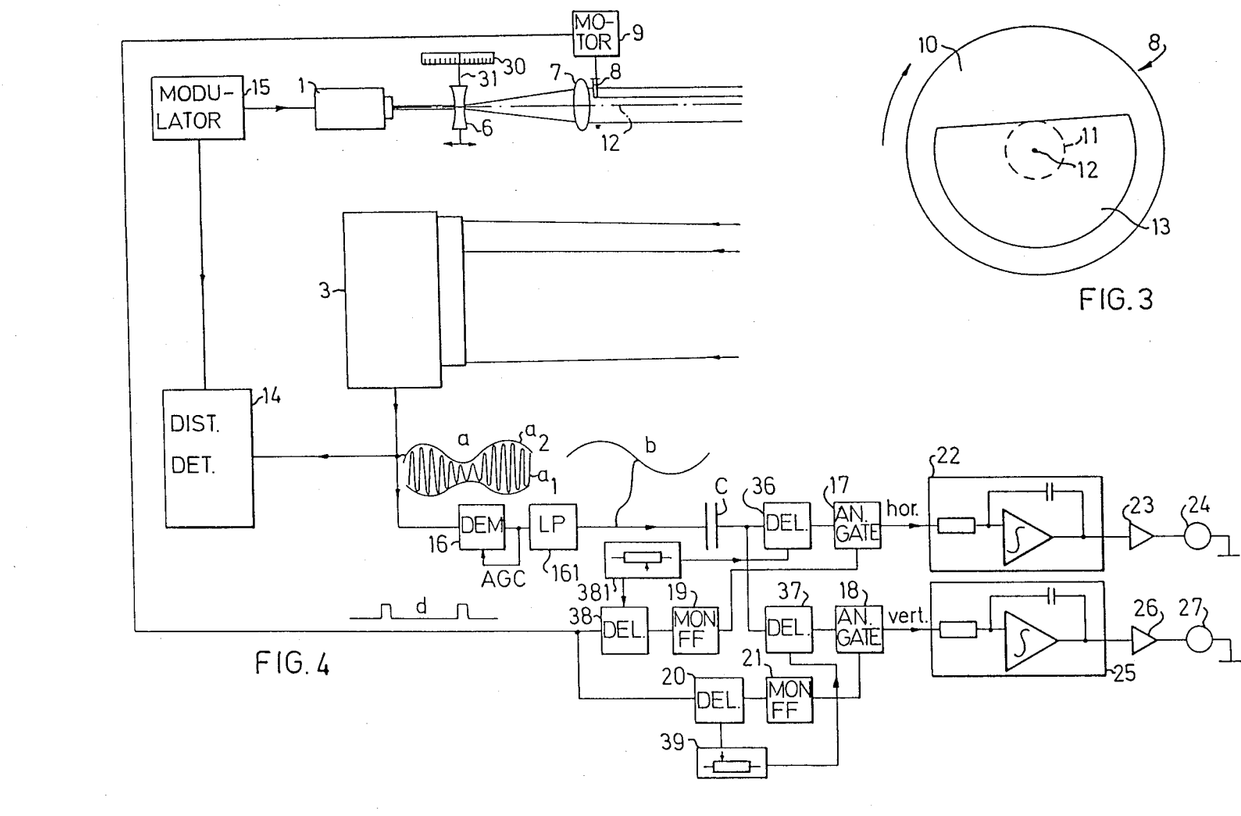
FIG. 3 is a first embodiment of an aperture system located in front of the transmitter of the rangefinder.
FIG. 4 illustrates a second embodiment of a target tracking rangefinder according to the invention.

In FIG. 4 there is illustrated a second embodiment of the invention where those parts which are similar to the FIG. 2 embodiment are identified by the same references. It is not necessary for transmission and reception of the beam from the transmitter 1 to be co-axial. Admittedly a somewhat poorer measuring result is obtained from the EDM-instrument when the transmitted and received beams of radiation extend side-by-side, parallel with one another, but there are many applications in which an uncertainty of some centimetres in the final measuring result is found acceptable. In the case of non-co-axial transmission and reception, however, there is obtained a certain additional phase-shift by the beam sweep modulation caused by the aperture system 8, which must be compensated for, so that the instrument is adjusted to the correct vertical and horizontal settings. Consequently, in the FIG. 4 embodiment each controllable delay unit 36,37 is placed in front of a respective one of the two analogue gates 17,18, upstream thereof. A delay unit 38 controlled in cooperation with the delay unit 36 enables the trigger time of the monostable flip-flop 19 to be controlled. The delay units 36,38 are controlled by a regulator 381, which is shown schematically to include a potentiometer. Similarly, a regulator 39 makes it possible to regulate the time delay in the delay unit 20 and to introduce a cooperative time shift in the input signal fed to the analogue gate 18. The two regulating units 381 and 19 can be regulated manually, although it is also possible to introduce some form of automatic adjustment, for example based on the distance to the prism or one some other condition.

The arrangement illustrated in FIG. 4 also includes a manually displaceable lens 6, to show that axial movement of the lens need not necessarily be effected automatically. This fact is not exclusive to the FIG. 4 embodiment, but is equally as applicable to the other embodiments, as is also automatic displacement of the lens, of course.

Figure 5:
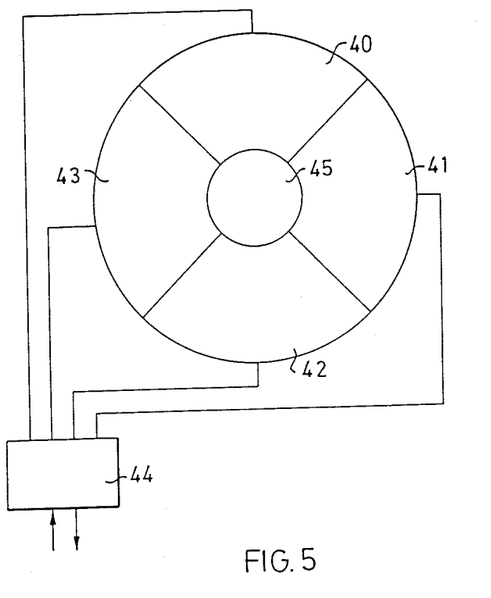
FIG. 5 illustrates a second embodiment of an aperture system placed upstream of the transmitter of the rangefinder and in the vicinity thereof.

It is not necessary for the aperture system to be mechanically rotatable as illustrated in FIGS. 2 and 4. Instead the aperture system may have the form illustrated in FIG. 5 and include a plurality, e.g. four, liquid crystal fields 40-43 capable of being controlled by a control means 44 in a manner such that each alternate field is transparent and each other alternate field opaque to radiation transmitted from the transmitter in accordance with a predetermined pattern, for example a pattern in which they are transparent in a sequential sequence and otherwise are opaque so as to obtain rotation, although other control patterns are possible. A suitable control pattern is one in which two opposing fields 40,42 and 41,43 respectively are steered to transparency and to opacity directly one after the other, and to alternately switch the order in which the two field blocks 40, 42 and 41,43 are steered. In this case the circuit 17-21 in FIG. 2 can be replaced with another circuit adapted to sense the signal b alternately during a part period of transparency in sequential sequence with respect to the fields 40,42 for servo-control or servo-adjustment of the vertical setting by the motor 27, and during a part period of transparency in sequential sequence in respect of the fields 41,43 for servo-control of the horizontal setting by the motor 24 and during a part period of transparency in sequential sequence in respect of the fields 40,42. The fields 40,42 and 41-43 are brought to transparency and to opacity respectively at a frequency which is adapted to the resetting of liquid crystals and which may be in the order of 10 Hz.

No example of the circuit on the receiver side has been shown, because this circuit may take many forms and can be readily constructed by one of normal skill in this art. Switching between vertical displacement indications and horizontal displacement indications can be effected with the same signals as those which bring the fields 40 and 41 to a transparent state. The aperture system illustrated in FIG. 5 has a central part 45 which is constantly transparent to radiation. Thus, the aperture system illustrated in FIG. 4 functions substantially in the same manner as the previously described mechanically rotated aperture system, but has no moving parts, which is an advantage.

Modulation of the peripheral part of the light beam can also be effected in other ways, for example by cyclically varying the polarization of this peripheral part of the beam.

Figures 6, 7:
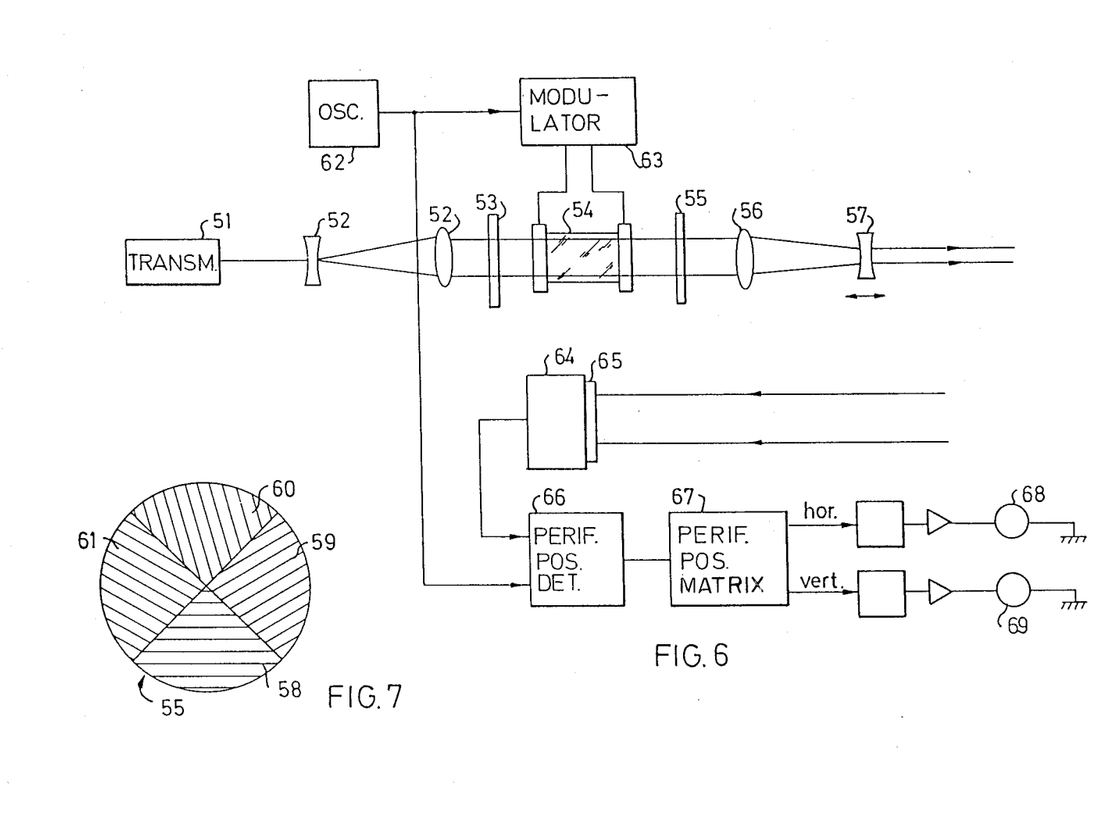
FIG. 6 illustrates a second embodiment of an aligning arrangement according to the invention.
FIG. 7 illustrates an embodiment of a polarizing unit incorporated in the arrangement of FIG. 5.

A special embodiment of an aligning arrangement according to the invention which is not intended to co-act with a measuring beam transmitted from an EDM-instrument is illustrated in FIG. 6. This alignment arrangement may use a steady or pulsatile beam. The transmitter of this embodiment is preferably a laser and transmits a beam of light through an optical system 52 which broadens the beam. The collimated beam of radiation leaving the optical system passes through a fixed polarizing device 53, a controllable polarization rotating device 54, which in the illustrated embodiment is a KDP-modulator but can equally as well include a rotatable polarizing device, a fixed depolarizing device 55, and finally through a further optical system 56,57 which narrows the beam and which introduces a light divergence in the exiting pencil of radiation. The further optical system 57 may have a part 57 which is suitably in the form of a negative lens arranged for movement along the optical axis for setting a desired divergence, similar to the lens 6 of the FIG. 2 embodiment. Either the polarizer 53 or the depolarizor 55 may be divided into a plurality of polarization fields 58-61, e.g. four, as illustrated in FIG. 7, this figure illustrating one of these components in front view and in larger scale than FIG. 6. The other of these components is then a polarizing disc which polarizes the whole cross-section of the through-passing beam to an equal extent. This component is suitably the polarizer 53, the component illustrated in FIG. 7 being the depolarizer 55.

The output signal from an oscillator 62 is fed to a modulator 63, which applies a variable voltage across the controllable polarization rotator 54 so that it induces a phase rotation of the beam of radiation cyclically in time.

A receiver 64 which includes a detector 65 which is sensitive to the incoming light beam captures the light beam whose peripheral portion has been modulated by the polarization rotator 54 and the polarizor 53 or the depolarizor 55 having the form illustrated in FIG. 7. The light beam is suitably transmitted and received co-axially in the same manner as that illustrated in FIG. 2, but not particularly that illustrated in FIG. 6.

The output signal on the receiver 64 is fed to the one input of a periphery position detector 66. The signal from the oscillator 62 is fed to the other input of the periphery position detector 64, and the directional sense of any deviation from a central alignment with a reflector located on the target is indicated by the detector 66 in response to these two signals. The frequency of the oscillator 62 is selected at a sufficiently low level to ensure that the travel space to and from the reflector (not shown) located on the target causes not appreciable phase shift in the signal received by the receiver 64. The output signal on the detector 64 is fed to a periphery position matrix 67 which on the basis of the input signal determines in which direction the target finder deviates from target alignment and controls via servo-means a horizontal deflection motor 68 and a vertical deflection motor 69 via a servo-filter and power stage.

Instead of dividing solely one of the components 53 and 54 into different fields of different polarization, both of said components may be divided into fields, in which case the number of fields need only be half the number present when solely one component is divided into fields, for example so that the two units are divided into two fields. In this case the two polarizing units 53,54 are rotated relative to one another about the optical axis, so that the fields do not overlap each other, but are displaced when seen in a projection in the direction of the optical axis.

The condition made in respect of the mutually different polarizations introduced to the beam of radiation by the two units, irrespective of whether solely the one or both of the units are divided into fields, is that when controlling the polarization phase with the polarization rotator 54 there is obtained in the peripheral areas of the beam, said areas being divided by a respective one of the units 53 and 55, a peripheral phase modulation with retained mutual polarization relations between the different peripheral areas.

It is alos conceivable to rotate the polarization of the peripheral portion of a measuring beam from an EDM-instrument. In this case, for example four KDP-crystals of mutually the same kind and controlled in mutually the same manner, may be placed in a circle around an open part around the optical axis, and the polarizor 53 and the depolarizor 55 have then open central parts so that at least the one obtains the configuration of the aperture system comprising liquid crystals and illustrated in FIG. 5. It is also conceivable to use some form of annular controllable polarizor having a central through-passing thin-walled hole.

Many modifications are possible within the scope of the claims.

We claim:

1. An instrument which is adapted to be maintained in alignment with a reflector, such as a cube corner prism, which moves in relation to the instrument, said instrument comprising:
   (a) transmitter means for transmitting towards said reflector for reflection thereby an electromagnetic beam of radiation which is substantially collimated or slightly divergent;
   (b) receiver means for receiving the beam of radiation reflected by said reflector and for producing a corresponding output;
   (c) an optical modulating means, disposed in the path of the beam of radiation transmitted by said transmitter means, for varying, at a predetermined frequency, the light intensity in at least the peripheral portion of the beam in a cyclically varying manner around the optical axis of the transmitted radiation beam so as to provide modulation of at least the peripheral portion of said transmitted beam;
   (d) an electrical circuit, connected to said receiver means to receive the output therefrom, for processing at least the part of the output produced by said receiver means corresponding to the modulated peripheral portion of the transmitted beam and for producing an output signal in accordance therewith, and
   (e) servo means, connected to said transmitter means and responsive to the output signal produced by said electrical circuit, for displacing the direction of said transmitted beam in a sense such as to reduce said output signal to a minimum.

2. An arrangement according to claim 1, wherein the optical modulating means comprises an aperture system which is mechanically secured in a holder and which presents an asymmetric aperture, and a rotational motor which is arranged to rotate the aperture system about the optical axis of the transmitted beam in a plane at right angles to said axis.

3. An arrangement according to claim 1, wherein the optical modulating means comprises an aperture system which includes a disc presenting fields of electrically controllable liquid crystals and control means for making said fields transparent or opaque in a predetermined sequence.

4. An arrangement according to claim 2, wherein the active transmitting surface of the beam of radiation transmitted from the transmitter means upstrem of the aperture system substantially fulfils the conditions for a planar wave front; and wherein the aperture of the aperture system has a form such that the central, most intense part of the beam is substantially unaffected by the aperture system.

5. An arrangement according to claim 4, wherein that said central part includes that part of the beam which has an intensity greater than a predetermined percentage of the maximum intensity, said percentage lying between 60% and 80%.

6. An arrangement according to claim 1, wherein the optical modulating means comprises a polarization unit which includes a stationary polarizing device, a controllable polarization rotator and a depolarization device, at least one of the polarization rotator and the depolarization device having at least two polarization fields of mutually different polarization so dimensioned that when inducing the polarization phase of the polarization rotator the exiting beam of radiation obtains, in the peripheral areas thereof, divided by the polarizing rotator and the depolarizing device, a peripheral phase modulation with a retained, mutual polarization relationship between the different peripheral areas.

7. An arrangement according to claim 11, wherein the electrical circuit includes means for sampling the modulating signal taken from the signal from the receiver so that the modulating signal or the sampled parts thereof provides information relating to deviations in at least one predetermined direction; and wherein the servo means includes a servo-system for each predetermined direction, said servo-system being controllable separately for each direction responsive to signals from the electric circuit.

8. An arrangement according to claim 7, wherein said sampling means effects sampling within a predetermined range after predetermined lengths of time have lapsed subsequent to the occurrence of signals produced with the same frequency as the modulation frequency.

9. An arrangement according to claim 1 for an EDM-instrument in which the beam of radiation from the transmitter is high-frequency modulated so that the peripheral modulation is arranged with the high frequency as a carrier wave, wherein the electrical circuit includes means for demodulating the signal from the receiver means to obtain a signal used providing peripheral modulation of the transmitted beam prior to analyzing the lastmentioned signal.

10. An arrangement according to claim 1, further comprising an optical system, located rearwardly of the transmitter means in the direction of the beam, for broading and diverging the beam transmitted by the transmitter means, said optical system including variable means for providing variable divergence of the transmitted beam of radiation.

11. An arrangement as claimed in claim 5 wherein said percentage is about 70%.

* * * * *